(12) United States Patent
Kao et al.

(10) Patent No.: US 7,103,547 B2
(45) Date of Patent: Sep. 5, 2006

(54) IMPLEMENTING A HIGH ACCURACY CONTINUOUS SPEECH RECOGNIZER ON A FIXED-POINT PROCESSOR

(75) Inventors: Yu-Hung Kao, Plano, TX (US); Yifan Gong, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 896 days.

(21) Appl. No.: 10/136,967

(22) Filed: May 2, 2002

(65) Prior Publication Data

US 2002/0198706 A1    Dec. 26, 2002

Related U.S. Application Data

(60) Provisional application No. 60/288,799, filed on May 7, 2001.

(51) Int. Cl.
*G10L 19/00* (2006.01)

(52) U.S. Cl. ........................ 704/251; 704/200
(58) Field of Classification Search ................ 704/200, 704/251
See application file for complete search history.

(56) References Cited

U.S. PATENT DOCUMENTS

| | | | |
|---|---|---|---|
| 5,924,065 A * | 7/1999 | Eberman et al. | 704/231 |
| 6,236,963 B1 * | 5/2001 | Naito et al. | 704/241 |
| 6,691,090 B1 * | 2/2004 | Laurila et al. | 704/250 |
| 6,804,643 B1 * | 10/2004 | Kiss | 704/234 |

* cited by examiner

*Primary Examiner*—Daniel Abebe
(74) *Attorney, Agent, or Firm*—W. James Brady, III; Frederick J. Telecky, Jr.

(57) ABSTRACT

A small vocabulary speech recognizer suitable for implementation on a 16-bit fixed-point DSP is described. The input speech xt is sampled at analog-to-digital (A/D) converter 11 and the digital samples are applied to MFCC (Mel-scaled cepstrum coefficients) front end processing 13. For robustness to background noises, PMC (parallel model combination) 15 is integrated. The MFCC and Gaussian mean vectors are applied to PMC 15. The MFCC and PMC provide speech features extracted in noise and this is used to modify the HMMs. The noise adapted HMMs excluding mean vectors are applied to the search procedure to recognize the grammar. A method of computing MFCC comprises the steps of: performing dynamic Q-point computation for the preemphasis, Hamming Window, FFT, complex FFT to power spectrum and Mel scale power spectrum into filter bank steps, a log filter bank step and after the log filter bank step performing fixed Q-point computation. A polynomial fit is used to compute log2 in the log filter bank step. The method of computing PMC comprises the steps of: computing noise MFCC profile, computing cosine transform MFCC into mel-scale filter bank, converting log filter bank into linear filter bank with an exponential wherein to compute exp2 a polynomial fit is used, performing a model combination in the linear filter bank domain; and converting the noise compensated linear filter bank into MFCC by log and inverse cosine transform.

10 Claims, 2 Drawing Sheets

IMPLEMENTING A HIGH ACCURACY CONTINUOUS SPEECH RECOGNIZER ON A FIXED-POINT PROCESSOR

This application claims priority under 35 USC § 119(e)(1) of provisional application No. 60/288,799, filed May 7, 2001.

FIELD OF INVENTION

This invention relates to speech recognition and more particularly to a high accuracy continuous speech recognizer using a fixed-point processor.

BACKGROUND OF INVENTION

Recently there has been a sharp increase in the use of wireless communication devices, such as mobile phones, in the car. Such dialing while driving situation fits the classic definition of a hands busy, eyes busy task. Speech recognition is a natural and effective solution. Not only convenience, but also safety concerns motivate the use of voice technology in this situation. Other than mobile phones, as PDA (personal digital assistance) devices become smaller, input becomes more difficult. Speech recognition is a natural way to interact with these small devices because button or touch screens are not feasible or too expensive. All those devices are battery powered. Continuous speech recognition is a resource intensive algorithm. Commercial dictation software requires more than 10 M bytes to install on a disk and 32M bytes RAM to run the applications. A typical embedded system can not afford this much RAM because of its high cost and power consumption. It also lacks disk to store the large amount of static data (acoustic models). A 32-bit, floating point CPU with lots of memory is too expensive and drains too much power. Most of these embedded fixed point processor devices use a 16-bit, fixed point CPU with only on chip memory. It is highly desirable to fit a speech recognition algorithm on such a device without performance degradation or sacrificing functionality.

A most challenging condition is to provide this for hands free digit dialing in a highway driving condition.

SUMMARY OF INVENTION

In accordance with one embodiment of the present invention a continuous speech recognizer with Mel-scaled cepstrum coefficients (MFCC) processing is provided using fixed-point processor with conversion and size (program, model, search space, etc.) reduction.

DESCRIPTION OF PREFERRED EMBODIMENTS OF THE PRESENT INVENTION

Figure 1:
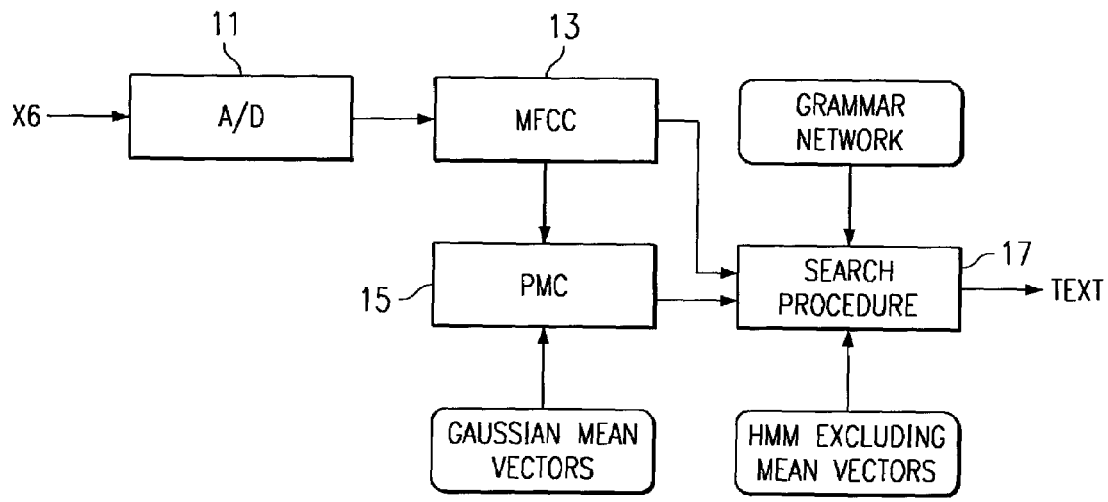
FIG. 1 illustrates a speech recognizer.

Referring to FIG. 1 the input speech xt is sampled at analog-to-digital (A/D) converter 11 and the digital samples are applied to MFCC (Mel-scaled cepstrum coefficients) front end processing 13 to extract speech features used for speech recognition. This is described in S. B. Davis and P. Mermelstein article entitled "Comparison of Parametrix Representation for Monosyllabic Word Recognition in Continuously Spoken Sentences" in IEEE Trans. Acoustic. Speech and Signal Processing; ASSP-28(4);357–366;August 1980. To enhance performance against additive noise, PMC (parallel model combination) 15 is integrated. PMC 15 is described in Technical Report F-INFENG/TR-135, Cambridge University Engineering Department, UK, 1993 by J. F. Gales and S. J. Young entitled "Parallel Model Combination for Speech Recognition and Noise". The MFCC and Gaussian mean vectors are applied to PMC 15. The features extracted in the noise are used to modify Hidden Markov Models (HMMs) to adapt the models to the noisy environment. The adapted HMMs including mean vectors are applied to the search procedure to recognize the grammar. The search engine 17 is based on time-synchronous one pass procedure described in article by H. Ney entitled "The use of One Stage Dynamic Programming Algorithm for Connected Word Recognition in IEEE Trans. On Acoustics, Speech and Signal Processing, 32(2):263–271, April 1984.

Fixed-Point Issues:

In a floating-point processor, all numbers are normalized into a format with sign bit, exponent, and mantissa. For example, the IEEE standard for float has 1-bit sign bit, 8-bit exponent, and 23-bit mantissa. The exponent provides a large dynamic range: $2^{128} \approx 10^{38}$. The mantissa provides a fixed level of precision. Because every float number is individually normalized into this format, it always maintains a 23-bit precision as long as it is within the 1038 dynamic range. This good precision covering a large dynamic range frees the algorithm designer from worrying about the scaling problems. However, it comes at the cost of more power, larger silicon, and higher cost. In a 16-bit fixed-point processor, on the other hand, the only format is a 16-bit integer, ranging from 0 to 65535 (un-signed) or −32768 to +32767 (signed). The algorithm has to carefully normalize its numerical behavior to within the dynamic range of a 16-bit integer at every stage of the computation.

In addition to the data format limitation, another consideration is that some operations can be done efficiently, others cannot. A fixed-point DSP processor usually incorporates a hardware multiplier so that addition and multiplication can be completed in one CPU cycle. However, there is no hardware for division and it takes more than 20 cycles to do it by a routine. To avoid division, we want to pre-compute the inverted data. For example, we can pre-compute and store $1/\sigma$ instead of $\sigma$ for the Gaussian probability computation. Other than the explicit divisions, there are also implicit divisions hidden in other operations. For example, pointer arithmetics is used heavily in the memory management in the search algorithm. Pointer subtraction actually incurs a division. Division can be approximated by multiplication and shift. However, unlike DSP algorithms, pointer arithmetics cannot tolerate any error; such substitute is accurate only within a range of values. Algorithm design has to take this into consideration and make sure it is accurate under all possible running conditions.

Fixed-point problems can be very tedious to accommodate in algorithms, and some algorithms simply cannot be done using only 16-bit of precision. For example, audio and ADSL (Asynchronous Digital Subscriber Line) modem algorithms require very high precision FFT (Fast Fourier Transforms); they need 32-bit FFT to do the job right.

Fortunately, we found that 16-bit resolution is not a problem for speech recognition algorithm. With careful scaling, one can convert the algorithm to fixed-point with no performance degradation.

In a speech recognition algorithm, MFCC computation is where most of the fixed-point issues occur. Search, although more complicated and consumes the most MIPS, simply accumulates scores; therefore does not present much numerical precision problem. Following are the major steps in MFCC computation:
1. Preemphasis. $y_t = x_t - 0.96 \times x_{t-1}$.
2. Hamming Window. $z_t = \omega_t \times y_t$.
3. FFT. $f_n^r + i + f_n^i = \text{FFT}(z_t)$, $\forall n = 0 \ldots 255$.
4. Complex FFT to power spectrum.

$$P_n = (f_n^r)^2 + (f_n^i)^2.$$

5. Mel scale power spectrum into filter bank.

$$b_m = \text{Melfilter}(P_n), \forall m = 0 \ldots 19.$$

6. Log filter bank. $b_m^l = \log(b_m)$.
7. Inverse cosine transform log filter bank into MFCC.

$$c_i = \text{Inv } \cos \times fm(b_m^l), \forall i = 0 \ldots 7.$$

Figure 2:
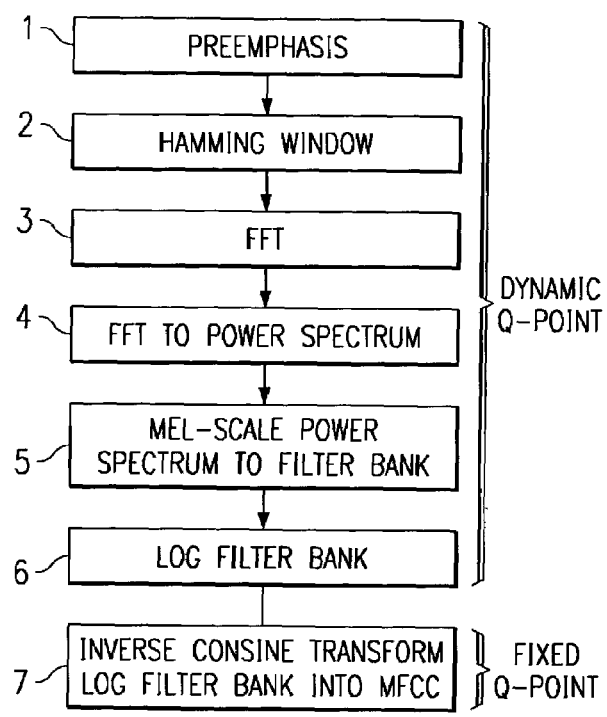
FIG. 2 illustrates processing steps for MFCC in the speech recognizer of FIG. 1 according to one embodiment of the present invention.

In accordance with the present invention these steps illustrated in FIG. 2 are performed in a unique manner to achieve the results in a fixed point processor. In these steps all the numeric variables in the algorithm need to be normalized and represented in a suitable Q-point. Q-n means there are n bits to the right of the decimal point. For example, for a 16-bit word, a Q 11 format covers the range from −16 to +16. To simplify the process, we classify the variables into two categories: dynamic Q-point and fixed Q-point. They are separated by the log operation in step 6 above. All variables before the log step 6 (Steps 1–5) are dynamic Q-point; all variables after that are fixed Q-point (Step 7) as illustrated in FIG. 2. This is because log reduces the dynamic range tremendously. It is possible to represent the range by a fixed Q-point 16-bit format after log. Before log, however, the dynamic range is too large to be covered by 16-bit; thus frame-dependent dynamic Q-point is required.

The design principals for fixed Q-point variables are:
Compute dynamic ranges for all variables.
Inspect the dynamic range and choose a fixed Q-point for each variable.
   For array variables (e.g. MFCC), each dimension may have different dynamic range. Choose a normalization factor for each of the dimension to normalize the dynamic range so they can all use the same Q-point.
Choose an appropriate place in the algorithm to incorporate the normalization factors.

Lower dimension MFCC has larger dynamic range. We choose the following normalization factors and use Q 11 to represent the 8 MFCC and 8 Δ-MFCC:

16 4 4 2 2 2 1 1 4 2 2 1 1 1 1 1

The normalization factors are incorporated in the inverse cosine transform Step 7. For variables before the log step, the dynamic range is very large and thus fixed Q-point is not feasible. We have to normalize each frame of data differently to maintain adequate precision. The design principals are:
Normalize to take advantage of the full 16-bit dynamic range.
Remember the normalization factors and compensate before output.

Floating-point processor normalizes every number independently. We cannot afford to do that because the scaling needs to be compensated before output. However, we can normalize every frame of data for every algorithm step. The compensation can be done in the log step easily. Such normalization is to scale up an array of values with a factor so that the largest value will be using the full 16-bit resolution.

The computation basically involves multiplication and addition. Although data memory is 16-bit only, the accumulator is 32-bit (or even 40-bit). The inputs to an operation have to be 16-bit values; the output value can be 32-bit. The normalization can be done at the 16-bit input or at the 32-bit output. For example, in the pre-emphasis step you can normalize the 16-bit input speech samples, $x_t$; or the 32-bit $x_t - 0.96 \times x_{t-1}$ pre-emphasized output. Normalizing the 16-bit input may give you less resolution because the worst case needs to be accommodated but may not occur. Normalizing the 32-bit output will give you more resolution at the cost of more computation or memory. This is because the 32-bit output needs to be scaled back to 16-bit to be fed into next step of the algorithm, and normalization is a two-pass process. We choose to normalize the 32-bit output: $x_t - 0.96 \times x_{t-1}$, $\omega_t \times y_t$, and $(f_n^r)^2 + (f_n^i)^2$, to achieve the best possible resolution; then scale them back to 16-bit: $y_t$, $z_t$, and $p_n$ respectively.

Because 16-bit FFT can already achieve no degradation in recognition performance, there is no need for a 32-bit FFT. For a 256-point FFT, there is a multiply-and-add at each butterfly stage, a scale down of factor 2 is needed at each stage to accommodate overflow in worst case. That amounts to a total of 8 bits scale down for an 8-stage, 256-point FFT.

A square-triangle mel-frequency filter bank is used to convert the 128-point power spectrum $p_n$ into a 20-point mel-scale filter bank $b_m$ in Step 5. The 20-point $b_m$ is stored in 32-bit because this is the value fed into the log dynamic range reduction operation. It is important to maintain as much resolution as possible. This is the only 32-bit value array. All other values in the algorithm are in 16-bit.

The $\log(x)$ operation in Step 6 is implemented by polynomial fit for $x=0.5–1.0$. The curve is very smooth, thus the polynomial fit is very accurate. Input x is first normalized to between 0.5 and 1.0 in Q 15, then fed into the polynomial evaluation. Using the C54 native POLY mnemonic to compute polynomial is very fast; and it avoids the need for a large lookup table. The compensation for all previous normalization factors is done here because it is only shift. A 2-base log is implemented so the compensation can be done by shift. A 10-base log can be computed by simply multiplying a factor.

To elaborate on the polynomial log implementation a little bit, the following MATLAB commands are used to obtain the coefficients of the polynomial that fit log2(x) for x=0.5 to 1.0.

x=[0.5 :0.0.001.0];
y=log2(x);
z=polyfit (x, y, 8);
z*347.8996

First an array of x between 0.5 and 1.0 is created, with 0.001 sampling interval. Then y=log2(x) is computed. Then we use an 8th-order polynomial to fit the (x, y) pair. The 347.8996 factor applied on the coefficients is to scale the largest coefficient to −32768 to take advantage of the 16-bit resolution because we can only compute the polynomial in 16-bit integer. The output of log is in Q 9. It is fed into the inverse cosine transform matrix multiplication to generate MFCC in Q 11 in Step 7.

The Q 11 MFCC can be converted back to floating-point values. We have compared it with the MFCC from the floating-point version of the algorithm. They are very close: identical to the second and third decimal points even for very low energy frames.

PMC Issues:

Other than MFCC computation, PMC also presents fixed-point problems. A simplified PMC is implemented that compensates only mean (not variance); and it uses the log-add assumption (instead of the more accurate log-normal assumption). The major steps are:
1. Compute noise MFCC profile.
2. Cosine transform MFCC into log mel-scale filter bank.

$$b^l = Cos \times fm(C_i), \forall i=0 \ldots 7, m=0 \ldots 19.$$

3. Expotential—use polynominal fit to do exp. to convert log filter bank into linear filter bank.

$$b_m = \exp(b_m^l)$$

4. Model combination in the linear filter bank domain.
5. Convert the noise—compensated linear filter bank into MFCC by log and inverse cosine transform.

Figure 3:
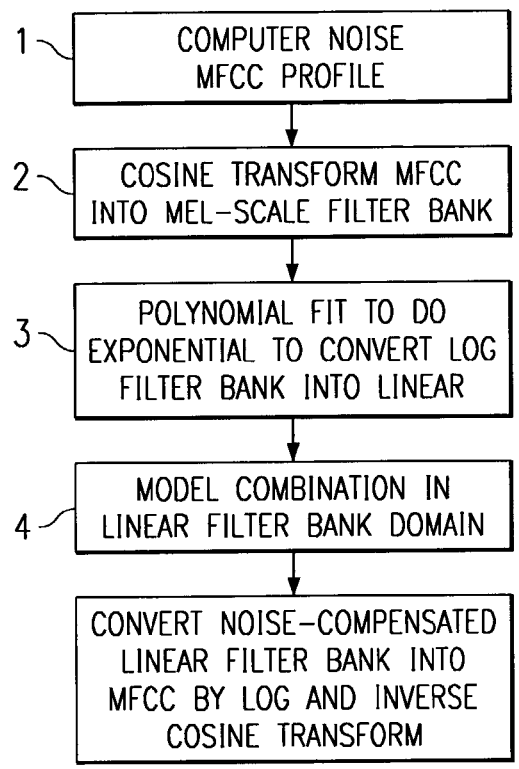
FIG. 3 illustrates processing steps for PMC in the speech recognizer according to one embodiment of the present invention.

The PMC steps are illustrated in FIG. 3. In step 1 the noise MFCC profile is computed as discussed above. The 2-base exponential, $y=2^x$, in Step 3 is implemented by polynomial fit for x=0–1. Input x is in 16-bit Q 9, consistent with the MFCC design. It is first normalized to between 0 and 1, then fed into the polynomial evaluation. It is more accurate than the piecewise linear table lookup because both functions are very smooth. It is fast because it uses the C54 DSP native POLY instruction. And most importantly, it does not need the large lookup table, which is very critical because memory is a premium in an embedded system. The normalization is compensated before outputting a 32-bit linear filter bank value. Because the exponential operation increases dynamic range tremendously, it is possible that the linear filter bank value may be more than 32-bit. This was not done in the MFCC computation because all the normalizations before the log operation take care of it. To avoid overflow of the exponential polynomial, we need to normalize x into a range that can be accommodate by the exponential polynomial. The exponential polynomial will not handle the full 16-bit range as exponent. This normalization then needs to be compensated in the log operation in step 5, which follows the exponential operation. The normalization before and after the exp2 operation in the PMC algorithm enables handling more than 32 bits of resolution, which is necessary to cover the dynamic range required by the PMC algorithm.

Software Design Issues

To elaborate polynominal fill for Pow 2 from 0 to 1.0. are MATLAB commands
x=[0:,0.01:1.0];
y=pow2(f);
z=polyfit (x, y, 6);
z*16384

Figure 4:
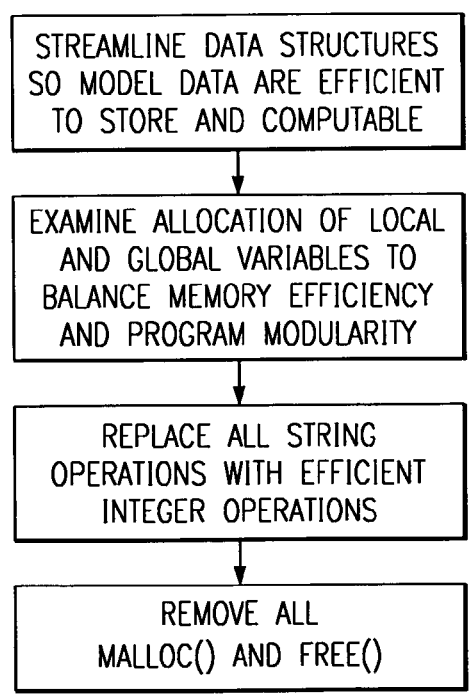
FIG. 4 illustrates software steps according to one embodiment of the present invention.

In an embedded system, resource is very scarce and needs to be critically conserved. Many seemingly innocent system function calls actually use a lot of resources. For example, string operation and memory allocation are all very expensive. Calling one string function will cause the whole string library to be included; and malloc( ) actually gives you more than what you need. The following major issues are addressed as represented by steps in FIG. 4.

Streamline data structures so that all model data are efficient to store and also computable, as opposed to the typical two format scheme: one for disk storage and the other for computation.

Examine the allocation of local and global variables to balance memory efficiency and program modularity. Local variables consume stack size. This is especially important for recursive routines.

Replace all string operations with efficient integer operations.

Remove all malloc( ) and free( ). Design algorithm to do memory management and garbage collection. The algorithm is tailored for exact data structure to be efficient.

Experimental Conditions

Two corpora were used to calibrate the performance:

TI digits: This is the publically available corpus. 1 to 7 continuous digit strings, very clean studio quality recording, 8700 test files.

WAVES digits: This is a proprietary corpus. It is a very challenging corpus collected in car (Pontiac Grand AM), with hands-free visor mounted microphone for 20 speakers, 10 male and 10 female. The text consists of 4, 7, and 10 continuous digit strings. There are three driving conditions: parked, stop and go city driving, and highway. 800 utterances per condition were used to calibrate the performance. Because it is hands-free data, the highway condition has a SNR about zero dB.

To recognize TI digits, we used the utterances in the training part of the corpus, which does not include the 8700 test files.

Recognizing WAVES digits with HMMs trained with TI digits will result substantial increase in error rate, due to the acoustic mismatch (e.g. microphone, background noise) between the recording conditions of the two tasks. See Y. Gong. Speech recognition in noisy environments: A survey. Speech Communication, 16(3):261–291, April 1995. As there is not enough speech data to train HMMs on WAVES corpus, to recognize WAVES digits a more elaborated procedure is applied. The procedure transforms HMMS trained on TI digits to the acoustic environment of the WAVES database by using a subset of WAVES database (not included in the test files). See Y. Gong and J. J. Godfrey. Transforming HMMS for Speaker-Independent Hands Free Speech Recognition in the Car. In Proc. of IEEE Int. Conf. on Acoustics, Speech and Signal Processing, pages I-297, Phoenix, March 1999.

Results

Program Size

The resource are computed using C code compiled by C54 compiler, there is no assembly code optimization considered. The unit is 16-bit word.

|  | C-compiled size |
| --- | --- |
| Program | 6K word |
| Constant table | 1K word |
| Stack | 1.5K word |

Because there is no performance degradation for fixed-point version compared to floating-point version, all the performances are calibrated using fixed-point codes. Recognition accuracy in terms of Word Error Rate (WER) and Sentence Error Rate (SER) is reported. Search space, which depends on task and varies a lot, is also reported. Search space size is computed using Chebychev's inequality: P(|x–

µ|>5σ)<1/25. This is a very loose bound. It actually covers more than 99% of the population as opposed to the 96% predicted by the equation.

For TI-digit, CMN (6) (Cepstrum Mean Removal) is enabled and PMC is disabled. 16 dimension MFCC (8 static, 8 dynamic), 428 mean and 270 variance vectors were used. The total model size is 21.5 K words.

|  | WER/SER | search space |
|---|---|---|
| TI digits | 0.6%/1.9% | 4.1K words |

For WAVES digits, CMN is disabled and PMC is enabled. 16 dimension MFCC, 428 mean and 428 variance vectors were used. The total model size is 25.3K words.

|  | WER/SER | search space |
|---|---|---|
| parked | 0.8%/4.3% | 3.3K word |
| stop and go | 2.0%/9.5% | 7.2K |
| highway | 8.6%/33.8% | 14K word |

As shown in the above table, error rate increases as noise increases Search space size also increases as noise increases.

Although there is no performance degradation from floating-point to fixed-point; larger model does provide better performance. We used a larger model for WAVES digits with 20 dimension MFCC (10 static, 10 dynamic), 1957 mean and 270 variance vectors were used. The total model size is 59K words. Unlike the smaller models above, it cannot fit into the C5410 on-chip memory.

|  | WER/SER | search space |
|---|---|---|
| parked | 0.6%/2.4% | 2.4K word |
| stop and go | 1.2%/6.3% | 5.3K word |
| highway | 5.1%/21.9% | 9.7K word |

As shown in the above table, larger model provides better performance. The search space also decreases because larger model is more accurate and thus results in better discrimination between confusing paths.

Most of the computation is consumed by search routine. Search time, like search space size, varies a lot depending on many factors: grammar perplexity, noise level, and model size, etc. We profile the MIPS consumed by various parts of the algorithm using two typical utterances: a very clean TI digit utterance and a very noisy WAVES hands-free, highway digit utterance. The cycle counts are done on a 100 MHz 5410 DSP chip, both program and data reside on zero-wait-state on-chip RAM.

The TI digit utterance is 1.36 seconds long; it takes 39 million cycles to complete the recognition. That amounts to 39/100/1.36=0.29 real time. We did not profile any further for this utterance because it is already much faster than real time.

The WAVES digit utterance is 1.66 seconds long; it takes 177 million cycles to complete the recognition. That amounts to 177/100/1.66=1.07 real time. The 177 million cycles are distributed among various parts of the algorithm:

| Algorithm | cycles (in million) |
|---|---|
| MFCC | 21 |
| PMC | 41 |
| Utterance detection | 15.7 |
| Gaussian score | 11.5 |
| Search and memory management | 87.8 |

The time consumed by MFCC and utterance detection is relatively constant per frame of speech; it increases proportional to the length of the utterance. The time consumed by PMC is proportional to the model size. The time consumed by search and Gaussian score computation (incurred by search) varies a lot.

It is very difficult to quote the exact MIPS needed by a recognition algorithm because it varies a lot. From our analysis above, a 100 MHz 5410 can recognize a relatively clean utterance much faster than real time. The very noisy utterance can also be recognized very close to real time. A small buffer of MFCC is needed to buffer up frames whenever the computation falls behind real time. For a system with 8 dimension MFCC, 20 ms frame; a (8*50=400) words buffer can buffer 1 second of speech.

We only report continuous digits task because it is the most difficult small vocabulary task. For command phrase and speaker-dependent tasks, the number will be much better, i.e. lower error rate, smaller search space, and less MIPS.

We have shown that fixed-point implementation incurs no performance degradation on a speech recognition algorithm. This is validated on a very challenging, hands-free, highway, zero dB SNR corpus. This algorithm has been implemented on a low cost 16-bit, fixed-point DSP using only on-chip RAM.

All the number reported above are from C-compiled code, with no assembly code optimization. As shown in the tables, the search space is still quite small for the most difficult condition. We can afford to increase the search beam to improve performance depending on system configuration. There are also different allocations of mean and variance sizes that may provide better size vs. accuracy trade-off. Assembly optimization can be easily added to the MFCC algorithm to cut down on program size and MIPS.

The invention claimed is:

1. A method of computing Mel-Scaled Cepstrum Coefficients (MFCC) comprising the steps of: performing dynamic Q-point computation for the pre-emphasis, Hamming Window, FFT, complex FFT to power spectrum and Mel scale power spectrum into filter bank steps, a log filter bank step using polynomial fit to compute log2 in the log filter bank step and after the log filter bank step performing fixed Q-point computation.

2. A method of computing Parallel Model Combination (PMC) comprising the steps of: computing noise Mel-Scaled Cepstrum Coefficients (MFCC) profile, computing cosine transform MFCC into mel-scale filter bank, converting log filter bank into linear filter bank with an exponential wherein to compute exp2 a polynomial fit is used, performing a model combination in the linear filter bank domain; and converting the noise compensated linear filter bank into MFCC by log and inverse cosine transform.

3. The method of claim 2 wherein there is normalization before and after the exp2 operation in the PMC algorithm.

4. A small vocabulary speech recognizer suitable for implementation on a fixed-point processor comprising: an A/D converter for sampling input speech to provide digital samples; means for providing MFCC (Mel-scaled cepstrum coefficients) front end processing 13 to said digital samples to extract speech features; means for providing PMC (parallel model combination) processing to enhance the performance against additive noise wherein MFCC and Gaussian mean vectors are applied to PMC processing and means for using the features extracted in noise for modifying HMMs; a search engine responsive to the modified HMMs to recognize grammar; said means for proving MFCC comprises the steps of: performing dynamic Q-point computation for the preemphasis, Hamming Window, FFT, complex FFT to power spectrum and Mel-scale power spectrum into filter bank steps, a log filter bank step and after the log filter bank step performing fixed Q-point computation.

5. The recognizer of claim 4 wherein a polynomial fit is used to compute log2 in the log filter bank step.

6. The recognizer of claim 5 wherein the means for providing PMC processing comprises the steps of: computing noise MFCC profile, computing cosine transform MFCC into mel-scale filter bank, converting log filter bank into linear filter bank with an exponential wherein to compute exp2 a polynomial fit is used, performing a model combination in the linear filter bank domain; and converting the noise compensated linear filter bank into MFCC by log and inverse cosine transform.

7. The recognizer of claim 4 wherein means for providing PMC processing comprises the steps of: computing noise MFCC profile, computing cosine transform MFCC into mel-scale filter bank, converting log filter bank into linear filter bank with an exponential wherein to compute exp2 a polynomial fit is used, performing a model combination in the linear filter bank domain; and converting the noise compensated linear filter bank into MFCC by log and inverse cosine transform.

8. The method of claim 7 wherein there is normalization before and after the exp2 operation in the PMC algorithm.

9. The recognizer of claim 4 wherein for dynamic Q-point variables, normalization at three stages: pre-emphasis, Hamming window, and FFT power spectrum.

10. A method of speech recognition using a small vocabulary speech recognizer suitable for implementation on a fixed-point processor comprising the steps of: providing an A/D converter for sampling input speech to provide digital samples; providing MFCC (Mel-scaled cepstrum coefficients) front end processing of said digital samples to extract speech features used for recognition comprising the steps of performing dynamic Q-point computation for the preemphasis, Hamming Window, FFT, complex FFT to power spectrum and Mel scale power spectrum into filter bank steps, a log filter bank step and after the log filter bank step performing fixed Q-point computation; providing PMC (parallel model combination) processing for enhancing the performance against additive noise to present the features extracted in noise wherein MFCC and Gaussian mean vectors are applied to PMC processing wherein the means for providing PMC processing comprises the steps of: computing noise MFCC profile, computing cosine transform MFCC into mel-scale filter bank, converting log filter bank into linear filter bank with an exponential wherein to compute exp2 a polynomial fit is used, performing a model combination in the linear filter bank domain; and converting the noise compensated linear filter bank into MFCC by log and inverse cosine transform; modifying HMMs to adapt to the noisy environment using the features extracted in noise; and providing a search engine responsive to the modified HMMs to recognize grammar.

\* \* \* \* \*